US011550472B2

(12) United States Patent
Itagaki et al.

(10) Patent No.: US 11,550,472 B2
(45) Date of Patent: Jan. 10, 2023

(54) INDEX FILE WRITING ON TAPE STORAGE MEDIA

(71) Applicant: International Business Machines Corporation, Armonk, NY (US)

(72) Inventors: Hiroshi Itagaki, Yokohama (JP); Tsuyoshi Miyamura, Yokohama (JP); Noriko Yamamoto, Tokyo (JP); Tohru Hasegawa, Tokyo (JP); Atsushi Abe, Ebina (JP); Shinsuke Mitsuma, Machida (JP)

(73) Assignee: International Business Machines Corporation, Armonk, NY (US)

(*) Notice: Subject to any disclaimer, the term of this patent is extended or adjusted under 35 U.S.C. 154(b) by 101 days.

(21) Appl. No.: 17/209,349

(22) Filed: Mar. 23, 2021

(65) Prior Publication Data

US 2022/0308758 A1 Sep. 29, 2022

(51) Int. Cl.
*G06F 3/06* (2006.01)
*G11B 5/008* (2006.01)

(52) U.S. Cl.
CPC .......... *G06F 3/0604* (2013.01); *G06F 3/0611* (2013.01); *G06F 3/0613* (2013.01); *G06F 3/0632* (2013.01); *G06F 3/0682* (2013.01); *G11B 5/00813* (2013.01)

(58) Field of Classification Search
CPC .... G06F 3/0604; G06F 3/0632; G06F 3/0682; G11B 5/00813
See application file for complete search history.

(56) References Cited

U.S. PATENT DOCUMENTS

| | | | |
|---|---|---|---|
| 9,348,837 B2 | 5/2016 | Iwanaga | |
| 9,502,052 B1 | 11/2016 | Tohru | |
| 9,799,371 B1* | 10/2017 | Hirashima | G11B 20/1886 |
| 10,199,068 B2 | 2/2019 | Abe | |
| 10,331,628 B2 | 6/2019 | Abe | |
| 2016/0322073 A1* | 11/2016 | Tsukahara | G11B 5/5508 |
| 2018/0157420 A1* | 6/2018 | Abe | G11B 20/1201 |

FOREIGN PATENT DOCUMENTS

| | | |
|---|---|---|
| JP | 04125858 A | 6/1997 |
| JP | 04289546 A | 4/2002 |
| JP | 11224477 A | 4/2008 |

OTHER PUBLICATIONS

"Tape Indexing Methodology for Long Term Archives", ip.com, Prior Art Database Technical Disclosure, <https://priorart.ip.com/IPCOM/000174460>, IPCOM000174460D, Sep. 9, 2008, 9 pages.

* cited by examiner

*Primary Examiner* — Andrew J Cheong
(74) *Attorney, Agent, or Firm* — Joseph P. Curcuru (57) ABSTRACT

An approach for improving the writing an index file on tape storage by switching, via a tape drive, write sequences in an index partition, in which the tape drive switches between a normal wrap sequence and a reverse wrap sequence. Further, embodiments write the index information by the normal wrap sequence during initialization of the tape media, in which the tape media is being mounted for the first time. Additionally, embodiments write the index information by the reverse wrap sequence during an unmounting the tape media for the first time, and wherein the tape media is mounted based on index information written at a rearmost end of one or more data partitions during second and subsequent mounting.

17 Claims, 8 Drawing Sheets

|  | INITIALIZATION | | | SECOND AND SUBSEQUENT MOUNTING | | |
|---|---|---|---|---|---|---|
|  | MOUNTING | RECORD | UNMOUNTING | MOUNTING | RECORD | UNMOUNTING |
| CONVENTIONAL METHOD | 0 | 0 | N2+200 | 0 | N1 | N2+200 |
| ONLY REVERSE WRAP | 100 | 100 | 200-N2+d | 100 | 100-N1 | 200-N2+d |
| PRESENT METHOD | 0 | 0 | 200-N2+d | 100 | 100-N1 | 200-N2+d |
| APPLICATION OF PRESENT METHOD TO LTFS | 0 | 0 | 200-N2+d | N1 | 0 | 200-N2+d |

INDEX FILE WRITING ON TAPE STORAGE MEDIA

BACKGROUND OF THE INVENTION

The present application relates generally to magnetic tape file systems and more specifically to index file writing on tape storage media.

A tape drive is a data storage device that reads and writes data on a magnetic tape. Magnetic tape data storage is typically used for offline, archival data storage. Magnetic tape data storage is a system for storing digital information on magnetic tape using digital recording. Modern magnetic tape is most commonly packaged in cartridges and cassettes, such as the widely supported Linear Tape-Open (LTO). The device that performs the writing or reading of data is called a tape drive. Autoloaders and tape libraries are often used to automate cartridge handling and exchange. Tape data storage is now used more for system backup, data archive and data exchange. The low cost of tape has kept it viable for long-term storage and archive tape media generally has a favorable unit cost and a long archival stability. A tape drive provides sequential access storage, unlike a hard disk drive, which provides direct access storage. A disk drive can move to any position on the disk in a few milliseconds, but a tape drive must physically wind tape between reels to read any one particular piece of data. As a result, tape drives have very large average access times. However, tape drives can stream data very quickly off a tape when the required position has been reached. An indexed file is a computer file with an index that allows easy random access to any record given its file key. The key must be such that it uniquely identifies a record. If more than one index is present the other ones are called alternate indexes. The indexes are created with the file and maintained by the system.

SUMMARY

As disclosed herein, embodiments of the present invention disclose a computer-implemented method, a computer program product, and a system for optimizing writing an index file on a tape storage media, the computer-implemented method comprising: switching, via a tape drive, write sequences in an index partition, wherein the index partition is an area to record index information of data, and wherein the tape drive switches between a normal wrap sequence and a reverse wrap sequence; writing the index information by the normal wrap sequence during initialization of the tape media, wherein the tape media is being mounted for the first time; and writing the index information by the reverse wrap sequence during an unmounting the tape media for the first time, and wherein the tape media is mounted based on index information written at a rearmost end of one or more data partitions during second and subsequent mounting.

DETAILED DESCRIPTION

Embodiments of the present invention recognize that some storage devices and software which using the storage have function to keep "index" information. The index information enables access to specific data efficiently. For example, FILENAME versus RECORD Number of index information (e.g., fileA—1, fileB—13, and fileC—20). Embodiments of the present invention recognize that linear tape file system (LTFS) comprises one or more index files, wherein LTFS uses extensible markup language (XML) and a plurality of other metadata files. Embodiments of the present invention recognize that index information is normally stored at the fixed location, wherein software reads the information stored in the fixed location at first and then utilizes the read information to access requested data. Embodiments of the present invention recognize that sequential recording devices like tape storage are not able to keep the index information at the fixed location. For example, LTFS use a partitioning function and create a partition for the index information. Embodiments of the present invention recognize that there is an issue on physical tape storage devices because of the high density of recording data and the slight expansion of magnetic tape base film may cause issues when trying to read back data from the tape media.

Currently in the art there is a method to loosen the tension when the tape media is winding back to store inside of the tape cartridge. In this case, the whole length of the tape media has to be winded with low tension. Therefore, even if a position of tape is located around the beginning of the tape needs to rewind back the full-length of tape media by winding forward the tape to its last end, then rewind back to the beginning end with low tension (e.g., almost the entire length of the tape is winded on the reel in the tape cartridge). Embodiments of the present invention recognize that when current methods in the art are used, software is unaware of the tape behavior (e.g., loosening the tension and winding the entire reel of the tape cartridge), the software tries to write the index information at the beginning of tape so that the read back access the information at the next mount quickly. Embodiments of the present invention recognize that tape drive hardware behaves in the way described above, the handling of tape media at unmount operation comprises: (i) completing data recording at any point of location on the tape media; (ii) moving to beginning of the tape and storing the latest index information at the beginning of the tape; (iii) winding the tape forward to the last end of the tape; (iv) rewinding back into the tape cartridge with the low tension; and (v) unmounting the tape cartridge from the drive.

Embodiments of the present invention recognize that because both the behavior of the software which records index information at the beginning of tape and the hardware which wind to the end and rewind back to the beginning with low tension will happen at the unmount operation, current methods in the art will execute time consuming behavior as the tape is rewound and then wound back to the beginning. Regardless of wherever the end point of the data recording is on the tape medium, due to the occurrence of both operations, recording of data at the beginning of the tape medium for software reason and rewinding of the tape medium from the rearmost end for hardware reason, a redundant operation occurs in unloading the tape cartridge from the drive such that the tape medium is once moved to the beginning, wound to the rear end, and then rewound to the beginning.

Embodiments of the present invention solve the issues stated above by minimize such a redundant operation and reduce the cost for unloading (unmounting) the tape cartridge. Embodiments of the present invention comprise a special mode for software (such as LTFS) using the index (hereinafter referred to as the index aware mode) that is established for the tape drive. Embodiments of the present invention record data in the index partition, wherein to record data in the index partition the tape drive set to the index aware mode automatically distinguishes and uses two types of writing methods, the normal wrap sequence (using Wraps in the order from Wrap0 to Wrap1) and the reverse wrap sequence (using Wraps in the order from Wrap1 to Wrap 0). When a partition is newly created, the normal wrap sequence is used to record index data at the beginning of the partition. After having started data recording, the reserve wrap sequence is used. As the result, except for the case of writing data immediately after creation of partition, index data is written at the rearmost end of the tape even though software intends to write the index data at the beginning of the partition. Thus, it is unnecessary to return to the beginning of the tape to write index data and therefore unnecessary operation in unmounting, which is a problem, can be minimized.

Wrap: Wrap means a set of data tracks in recording data in the tape medium. Each Wrap is called by its number such as Wrap 0, Wrap 1, . . . Wrap N. As used herein, N represents a positive integer, and accordingly the number of scenarios implemented in a given embodiment of the present invention. Data is recorded by making the tape run from the beginning to the rearmost end of the tape medium in even-numbered Wraps or from the rearmost end to the beginning thereof in odd-numbered Wraps.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Implementation of embodiments of the invention may take a variety of forms, and exemplary implementation details are discussed subsequently with reference to the Figures (i.e., FIG. 1-FIG. 8).

Figure 1:
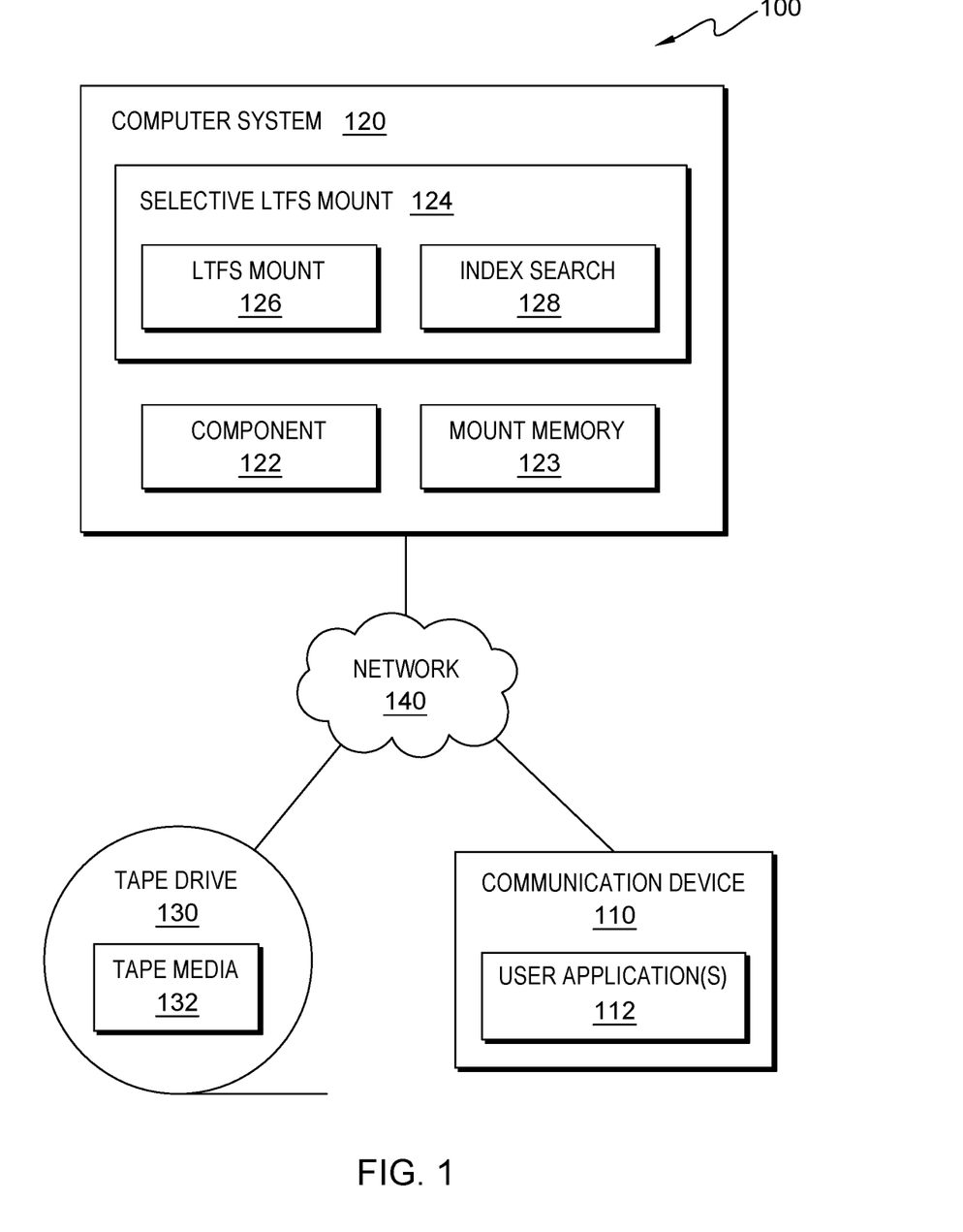
FIG. 1 illustrates a functional block diagram of a computing environment, in accordance with an embodiment of the present invention.

FIG. 1 illustrates a functional block diagram of a computing environment 100, in accordance with an embodiment of the present invention. Computing environment 100 comprises communication device 110, computer system 120 and tape drive 130, interconnected via network 140. communication device 110 and computer system 120 can be desktop computers, laptop computers, specialized computer servers, or the like. In certain embodiments, communication device 110, computer system 120 and tape drive 130 represent computer systems utilizing clustered computers and components acting as a single pool of seamless resources via network 140. For example, such embodiments can be used in data center, cloud computing, storage area network (SAN), and network attached storage (NAS) applications. In general, communication device 110, computer system 120 and tape drive 130 are representative of any electronic devices, or combination of electronic devices, capable of executing computer readable program instructions, as described in detail with regard to FIG. 4.

In one embodiment of the present invention, communication device 110 comprises user application(s) 112. user application(s) 112 can be a plurality of user application(s) 112 within communication device 110. user application(s) 112 can be an application used to perform operations such as, but not limited to, operation of selective LTFS mounting, viewing and exploring mounted file/directory structures from LTFS tape media within computing environment 100. In embodiments of the present invention, user application(s) 112 can comprise any combination of commercial or custom devices and/or software products associated with operating selective LTFS tape mounting.

In some embodiments of the present invention, communication device 110 may be, but is not limited to, a stand-alone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 140 or any combination therein. In general, communication device 110 may be representative of any programmable computing device or a combination of programmable computing devices capable of executing machine-readable program instructions and communicating with users of other computing devices via network 140 and/or capable of executing machine-readable program instructions and communicating with computer system 120. In some embodiments communication device 110 may represent a plurality of computing devices.

In some embodiments of the present invention, communication device 110 may represent any programmable electronic computing device or combination of programmable electronic computing devices capable of executing machine readable program instructions, manipulating executable machine-readable instructions, and communicating with computer system 120 and other computing devices (not shown) within distributed data processing environment 100 via a network, such as network 140. Communication device 110 may include an instance of user interface (interface), and local storage, not depicted in FIG. 1. In various embodiments, not depicted in FIG. 1, communication device 110 may have a plurality of interfaces. In other embodiments, not depicted in FIG. 1, distributed data processing environment 100 may comprise a plurality of computing devices, plurality of server computers, and/or one a plurality of networks. Communication device 110 may include internal and external hardware components, as depicted, and described in further detail with respect to FIG. 3.

Network 140 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 140 may include one or more wired and/or wireless networks that may receive and transmit data, voice, and/or video signals, including multimedia signals that include voice, data, text and/or video data. In general, network 140 may be any combination of connections and protocols that will support communications between communication device 110 and computer system 120, and any other computing devices and/or storage devices (not shown in FIG. 1) within distributed data processing environment 100.

In one embodiment of the present invention, tape drive 130 comprises tape media 132. tape drive 130 can be a plurality of tape drive 130 that can operate LTFS formatted tape media. In embodiments of the present invention, tape drive 130 can comprise any combination of commercial or custom devices and/or software products associated with operating LTFS tape media.

In one embodiment of the present invention, tape media 132 can be a plurality of tape media 132 within tape drive 130. tape media 132 can be physical LTFS formatted tapes in forms such as, but not limited to, cartridges and tape reels. tape media 132 can comprise any combination of commercial or custom devices adhering to LTFS or equivalent tape media standards.

In one embodiment of the present invention, computer system 120 comprises: (index aware mode in tape drive (component) 122, mount memory 123 and selective LTFS mount 124.

In one embodiment of the present invention, mount memory 123 can be a plurality of mount memories 123 within computer system 120. mount memory 123 can be system memory comprising information such as, but not limited to, file/directory structure and file data copied from tape media 132 during selective LTFS mount 124 operation.

In one embodiment of the present invention, selective LTFS mount 124 can be a plurality of selective LTFS mounts 124 within computer system 120. selective LTFS mount 124 can receive search input and/or parameters (e.g., a file/directory selection) to be mounted from tape media 132 and performs selective file/directory mounting toward mount memory 123. In embodiments of the present invention, selective LTFS mount 124 can comprise any combination of commercial or custom devices and/or software products associated with operating selective file/directory mounting.

In one embodiment of the present invention, selective LTFS mount 124 comprises LTFS mount 126 and index search 128. LTFS mount 126 can be operate mounting related data flow between tape drive 130 and mount memory 123 whereas index search 128 can operate LTFS mount 126 to limit LTFS mount 126 operation to mounting one or more selective files/directories. In another embodiment of the present invention, selective LTFS mount 124 can integrate LTFS mount 126 and index search 128 to operate selective file/directory mounting of tape media 132.

In one embodiment of the present invention, LTFS mount 126 can be a plurality of LTFS mounts 126 within selective LTFS mount 124. LTFS mount 126 can read LTFS Index metadata and send file/directory structure toward mount memory 123. LTFS mount 126 can create and send selective file structures toward mount memory 123 based on index search 128 results. In embodiments of the present invention, LTFS mount 126 can comprise any combination of commercial or custom devices and/or software products associated with mounting LTFS media (tape media 132).

In one embodiment of the present invention, index search 128 can be a plurality of index searches 128 within selective LTFS mount 124. Index search 128 can parse and search LTFS Index metadata used to select one or more files/directories for mounting based on received search input. Parsing of LTFS Index metadata can identify groupings of metadata elements, tagged with identifiers such as, but not limited to, file ID, directory ID, filename, directory name, filename to directory relationship identifier, UUID, partition ID and extent information. Search input can comprise information such as, but not limited to, one or more directories, one or more files and one or more dates/times. Further, search parameters can be received as search input modifiers and can be based on attributes such as, but not limited to, "wild cards" and date/time ranges. Embodiments can represent "wild cards" by attributes such as, but not limited to, special characters to substitute characters, numbers, date/time values and ranges. As index search 128 finds one or more file/directory meeting received search input and/or search parameters, index search 128 receives related file structure information and sends file structure data toward LTFS mount 126. In embodiments of the present invention, index search 128 can comprise any combination of commercial or custom devices and/or software products associated with operating index search 128.

In the depicted embodiment, component 122 is executed on computer system 120. In other embodiments, component 122 may be executed on communication device 110. In various embodiments of the present invention, not depicted in FIG. 1, component 122 may execute on a plurality of computer system 120 and/or on a plurality of computing devices 110. In some embodiments, component 122 may be located and/or executed anywhere within distributed data processing environment 100 as long as component 122 is connected to and/or communicates with, communication device 110, and/or computer system 120, via network 140.

In various embodiments of the present invention, tape drive 130 understands, from the information recorded in the cartridge memory loaded onto tape media 132 (i.e., tape media 132), the amount of data recorded in tape media 132 and the partition setting. In various embodiments of the present invention, tape drive 130 presumes that a partition with less capacity (Partition® in LTFS) is the partition for index (index partition). In various embodiments of the present invention, when a request for writing from the beginning of index partition is received after creation of index partition, tape drive 130 uses the normal wrap sequence to write data and then reports completion of writing. In one example, as the first data is written on tape media 132, information for identifying an application using tape media 132 and index data with no content are recorded, wherein the first written data is referred to as initialization data hereinafter.

In various embodiments of the present invention, it is effective to record the initialization data according to the normal wrap sequence after creation of partition because of the following two aspects. First, recording the initialization data according to the normal wrap sequence after the creation of a partition is an operation sequence which is likely to happen in general when a partition is created to record initialization data and then record user data. However, when using the reverse wrap sequence from the beginning, the reverse wrap sequence causes a redundant operation such that initialization data is recorded by causing the tape to run to the end of the tape, wherein the start of data recording must return to the beginning of the partition for data (data partition) or to the beginning of the tape in order to record user data. By using the normal wrap sequence, the redundant operation can eliminate.

Second, the intended use of the initialization data is to confirm whether the tape corresponds to the tape volume serial number (VOLSER) and an application (i.e., user application(s) 112) in use by reading, in addition to index data with no content, data including VOLSER label to distinguish tape media 132 and information to distinguish user application(s) 112 when a tape cartridge is mounted. However, a drive (e.g., tape drive 130) for which index aware mode 123 is not established starts reading the index partition according to the normal wrap sequence. Thus, absence of the initialization data at the beginning of index partition leads to a failure to identify tape media 132 and confirm an application in use. In various embodiments of the present invention, tape media 132 removable medium is mounted by a different drive, and therefore it is useful to enable the normal wrap sequence to read the initialization data as well.

In various embodiments of the present invention, data written in the index partition is held within a buffer in tape drive 130 to be prevented from being overwritten and an "initialization data holding" flag is set in tape drive 130 (e.g., tape drive 130). Hereinafter, the reverse wrap sequence (described below) is used in the index partition. Tape drive 130 is internally provided with a buffer memory. The buffer memory has a large capacity in general to play the role of absorbing a speed difference between a host interface and an interface to tape media 132 (e.g., 1 GB in the latest LTO drive). The aforementioned initialization data is sufficiently small relative to the capacity of the buffer memory. Thus, even if the initialization data is held in the buffer, tape drive 130 can read and write data as usual.

In various embodiments of the present invention, when a request for access to the index partition is received, tape drive 130 confirms the aforementioned "initialization data holding" flag. If the flag is set, tape drive 130 firstly writes the initialization data held in the buffer in the index partition by the reverse wrap sequence and then processes the request. In various embodiments of the present invention, if a partition was already created, tape drive 130 accesses the index partition by using the reverse wrap sequence. Index aware mode 123 may be established by using the existing setting means provided in tape drive 130 (e.g., DIP switch, writing to nonvolatile memory, or mode page small computer system interface (SCSI) command, etc.).

Figure 2:
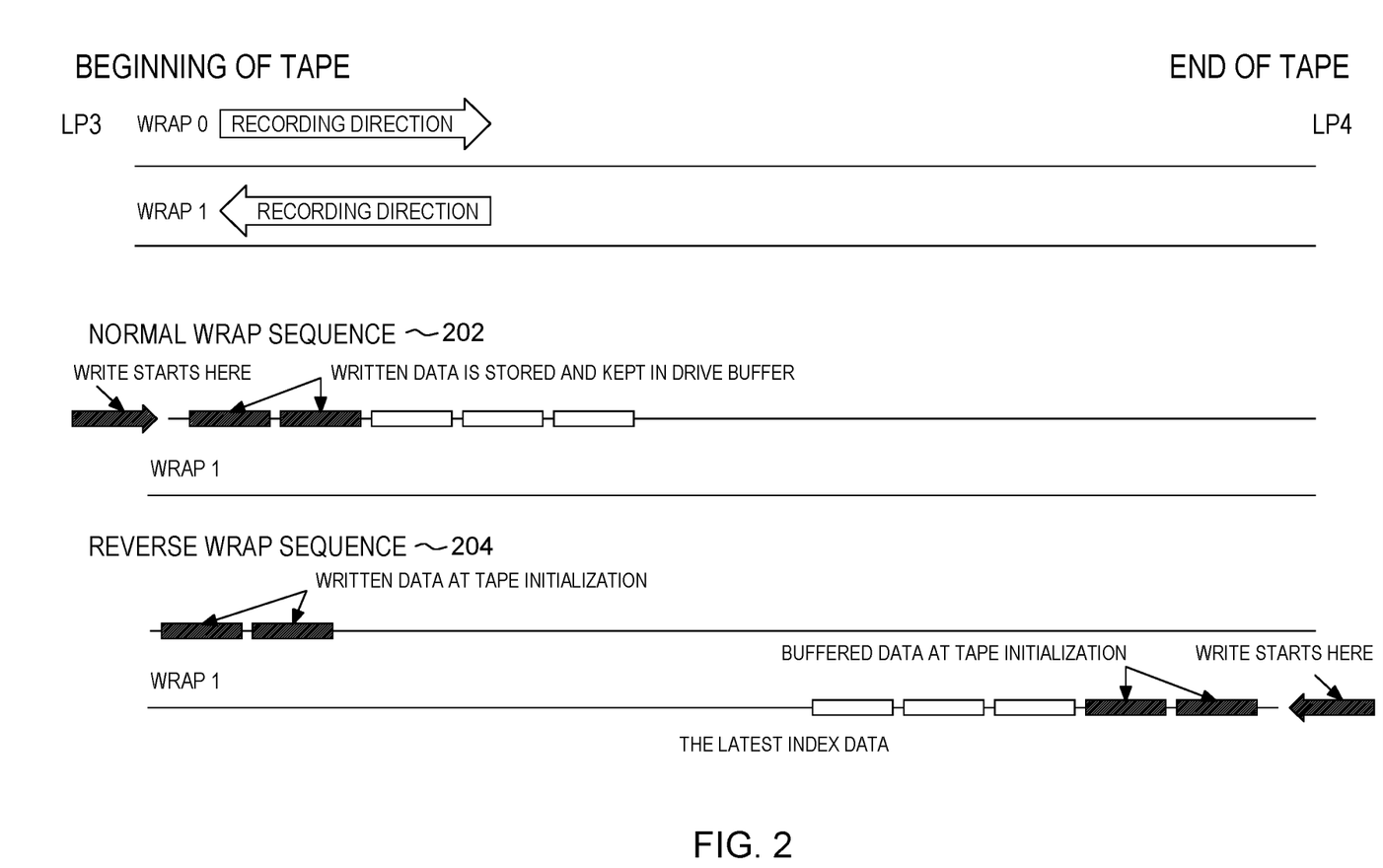
FIG. 2 depicts an example of traditional wrap sequence and reverse wrap sequence, in accordance with an embodiment of the present invention.

In various embodiments of the present invention, to access the index partition by using the reverse wrap sequence, tape drive 130 uses a Wrap that constitutes the partition in the order from odd-numbered Wrap to even-numbered as opposed to normal operation. For example, when a partition is composed of Wraps from Wrap0 to Wrap3, tape drive 130 uses Wraps in the order from 0 to 1, 2 and 3 in the normal wrap sequence, whereas tape drive 130 uses Wraps in the order from 1 to 0, 3 and 2 in the reverse wrap sequence, as depicted in FIG. 2. In FIG. 2, the beginning of tape media 132 starts at LP3 and ends at LP4. In the depicted embodiment the recording direction are opposite for Wrap 0 and Wrap 1. In the depicted embodiment, for normal wrap sequence 202 writes data to tape media 132 from Wrap 0 to Wrap 1, whereas in reverse wrap sequence 204 tape drive 130 writes to tape media 132 from Wrap 1 to 0.

Figure 3:
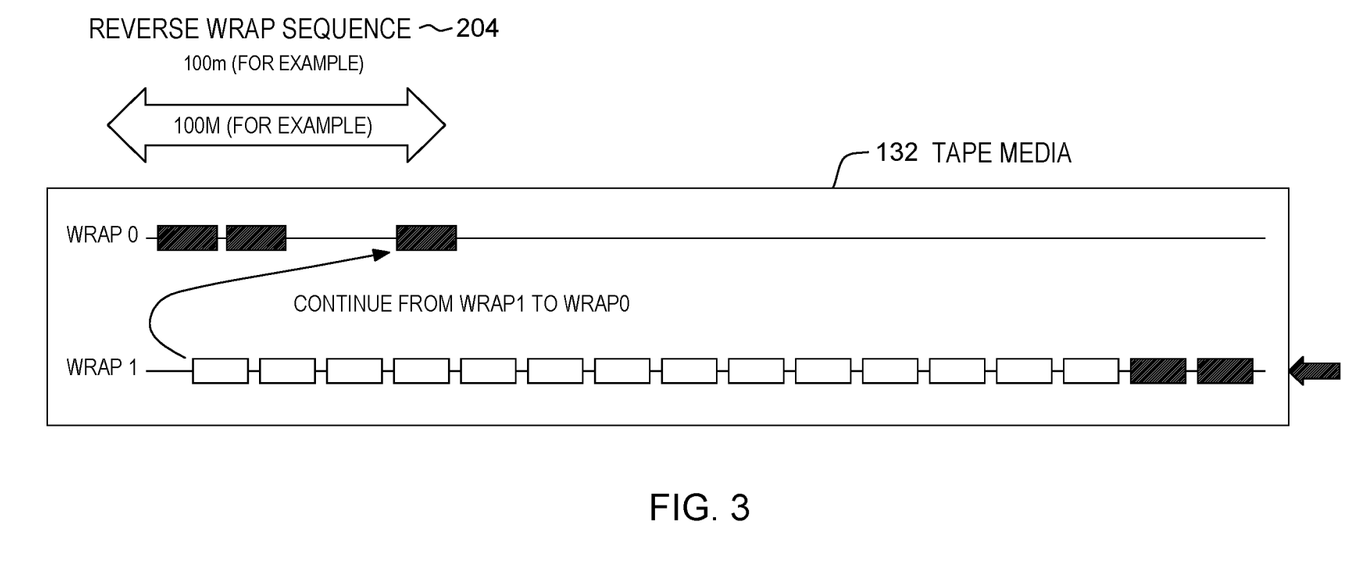
FIG. 3 depicts an example of reverse wrap sequence, in accordance with an embodiment of the present invention.

In various embodiments of the present invention, data is written in the normal wrap sequence only for initialization as stated above so that it is only area in the vicinity of the beginning of Wrap0 that is actually used. In one example, responsive to reverse wrap sequence 204 being continuously used thereafter on tape media 132, component 122 uses up Wrap 1 as the first Wrap and then moves onto writing data in the subsequent Wrap (Wrap0), as depicted in FIG. 3. In FIG. 3, when the Wrap is switched from Wrap 1 to Wrap 0, a start position of Wrap 0 is set by advancing the position from the normal position to the rear end direction by a specified value (e.g., 100 m) in order to record data. In the depicted embodiment, this mechanism (i.e., writing method to avoid overwriting already recorded initialization data & index data written at initialization) enables the holding of the index data recorded by the normal wrap sequence without overwriting the index data.

In various embodiments of the present invention, during mounting of tape media 132, tape drive 130 set to index aware mode 123 confirms from cartridge memory (CM) information, whether an index partition was already created with recorded data on tape media 132. In various embodiments of the present invention, component 122 executes a first mount without a created or creating an index partition. Component 122, via the normal wrap sequence, may seek the beginning of tape media 132 as usual by the normal wrap sequence. In various embodiments of the present invention, during the second and subsequent mounting of tape media 132, with created index partition and recorded data, component 122, via mount memory 123, seeks the beginning of the index partition or the rear end of tape media 132 in the reverse wrap sequence. In various embodiments of the present invention, with created index partition but no recorded data, it is considered that tape media 132 was unloaded before the initialization data was recorded. In this embodiment, the process starts from the normal wrap sequence in the same manner as the first mounting.

In various embodiments of the present invention, during tape media 132 formatting, as stated above, an application (e.g., user application(s) 112) using the index partition often writes, in initialization, information indicating that user application(s) 112 uses tape media 132. In the case of LTFS, data comprising VOLSER label and LTFS label is written at the beginning of tape media 132. In various embodiments of the present invention, after creation of a partition by user application(s) 112, tape drive 130 uses the normal wrap sequence to write these initialization data in the index partition. In various embodiments of the present invention, tape drive 130 reports completion of writing to user application(s) 112 so that tape formatting is terminated.

In various embodiments of the present invention, user data is recorded in the data partition. In one particular embodiment, because the normal wrap sequence is used in the partition, there is no behavioral difference caused by index aware mode 123. In various embodiments of the present invention, when tape media 132 is unmounted from tape drive 130, component 122, via user application(s) 112, writes the latest index information, wherein user application(s) 112 issues the following requests to tape drive 130: (i) move to the index partition from the partition for data; (ii) seek the position to write the index data; (iii) write the index data; (iv) unmount tape media 132. In moving to the index partition in the above (i), tape drive 130 may automatically performs an operation because the "initialization data holding" flag is set when tape media 132 is unmounted for the first time after initialization, wherein the operation comprises receiving a request. In various embodiments of the present invention, executing, via tape drive 130, the operation of receiving a request comprises: (i) moving to the beginning of the index partition to the rear end of tape media 132; (ii) confirming that the initialization data holding flag is set; (iii) write the held data and reset the data holding flag; (iv) report completion of the request.

In various embodiments of the present invention, owing to this operation, initialization data can also be read in the reverse wrap sequence. Therefore, the reverse wrap sequence may be used to access data from the beginning of the subsequent mounting. In various embodiments of the present invention, during tape remounting, when the initialized tape is mounted, initialization data and updated latest index data are read by the reverse wrap sequence in the same manner as stated above, wherein to read the initialization data and updated latest index data by the reverse wrap sequence component 122 moves to the beginning of the reverse wrap sequence or to the rear end of tape media 132. This means that performance deteriorates in mounting in comparison with the conventional method. The performance deterioration is due to distribution of tape media 132 moving cost as opposed to the conventional method in which said cost is concentrated in unmounting. The proposed invention distributes all the costs required in unmounting according to the conventional method to mounting and unmounting, whereby a redundant operation in unmounting can be minimized.

In various embodiments of the present invention, in the case of using LTFS, LTFS is defined under LTFS format such that the index data should also be recorded at the rearmost end of data recorded in the data partition. In various embodiments of the present invention, initialization data recorded at the beginning of the data portion by the normal wrap sequence and the latest index data recorded at the rearmost end of data on tape media 132 can be read in remounting, wherein it is unnecessary to move to the rear end of tape media 132 to read the latest index data, whereby tape moving cost in mounting can be reduced.

In various embodiments of the present invention, tape media 132 may be used in tape drive 130 operating in index aware mode 123. However, in various embodiments of the present invention, there may be a tape mounted in tape drive 130 that does not operate in index aware mode 123 due to the characteristic of tape media 132 as a removable storage. At that time, tape drive 130 that does not operate in index aware mode 123 accesses the index partition by the normal wrap sequence. However, even in such a case, use of the present invention allows reading a label, etc., used by user application(s) 112 because initialization data is also written by the normal wrap sequence at the time of the initialization.

In various embodiments of the present invention, if initialization data is unreadable by the normal wrap sequence, it leads to a state where no data can be read from the beginning of tape media 132 and such a state is undistinguishable from tape storage failure. Further, LTFS is provided with a mechanism to determine whether read index data is the latest one or not, wherein tape media 132 may be identified by initialization data, and wherein the mechanism here is the function of LTFS to determine whether read index data is the latest one or not. In various embodiments of the present invention, if the index file (or index data in LTFS) in the index partition is not the latest one (i.e., most recent index file) then tape drive 130 that does not operate in index aware mode 123 can access data correctly by reading the index file recorded in the data partition. In various embodiments of the present invention, occurrence of redundant operation in unmounting due to inconsistency between the behavior of drive hardware and the request of software can be minimized.

In various embodiments of the present invention, component 122 assumes that the cost for moving from the beginning of tape media 132 to the vicinity of the beginning of tape media 132 amounts to 0 point, the cost for moving from the beginning of tape media 132 to the vicinity of the rear end of tape media 132 amounts to 100 points, and the cost for moving from the beginning of tape media 132 to any position on tape media 132 amounts to N points (0<N<100).

In various embodiments of the present invention, present method, embodied by component 122, executes tape initialization, wherein tape initialization comprises initializing tape media 132 by moving to the beginning of the index partition, via normal wrap sequence, to the beginning of tape media 132 resulting in 0 points. Component 122 may record data after initialization, wherein data recording after initialization comprises initiating the recording of data by moving to the beginning of the data partition to the beginning of tape media 132 resulting in 0 points. In various embodiments of the present invention, the present method, embodied by component 122, executes second and subsequent mounting and data recording, wherein second and subsequent mounting comprise reading the index data by moving to the beginning of the index partition to the rear end of tape media 132 resulting in 100 points, and wherein data recording comprises writing data by moving to the data recording position N resulting in [100−N1] points. In various embodiments of the present invention, the present method, embodied by component 122, unloads/unmounts tape media 132, wherein unmounting tape media 132 comprises updating the index data by moving the index data from the beginning of the index partition, via reverse wrap sequence, to the rear end of tape media 132), and then rewind tape media 132 from the vicinity of the rear end of tape media 132 to the beginning of tape media 132 by low tension resulting in [(100−N2)+d+100] points.

In various embodiments of the present invention, the present method, embodied by component 122, in LTFS initializes tape media 132, wherein tape initialization of tape media 132 comprises initializing tape media 132 by moving the beginning of the index partition, via normal wrap sequence, to the beginning of tape media 132 resulting in 0 points. Component 122, in LTFS, may record data after initialization, wherein data recording after initialization comprises initiating recording by moving the beginning of the data partition to the beginning of tape media 132 resulting in 0 points. In various embodiments of the present invention, component 122 executes second and subsequent mounting, wherein second and subsequent mounting comprises reading the initialization data at the beginning of the data partition at the beginning of tape media 132, and then read the index data by moving to the data recording position to the rearmost end of the previous data resulting in (N1) [0+N1] points. Component 122, in LTFS, may record data and execute tape unmounting (e.g., unloading), wherein data recording comprises writing data by moving to the data recording position resulting in (N1) [0] points and wherein tape unmounting comprises updating the index data by moving the beginning of the index partition, via reverse wrap sequence, to the rear end of tape media 132, and then rewinding tape media 132 from the vicinity of the rear end of tape media 132 to the beginning of tape media 132 by low tension resulting in [(100−N2)+d+100] points.

Herein, N1 represents a position to start writing (or reading) after tape media 132 is mounted, and N2 represents a current position immediately before tape unmounting. Also, d represents a cost to return to the rear end of tape media 132 again after recording of the index data in the reverse wrap sequence, and is relatively small in comparison with the cost spent for running the entire length of tape media 132. The features and point measurements are summarized in a table depicted in FIG. 4.

Figure 4:
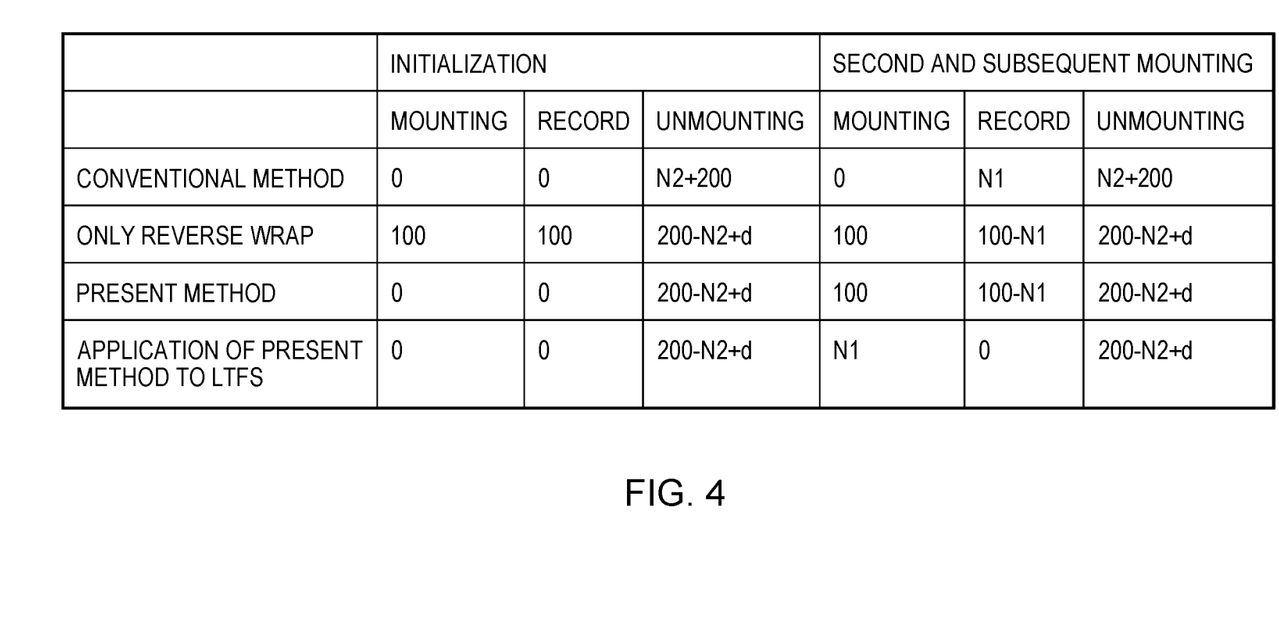
FIG. 4 depicts a comparison of traditional initialization and mounting methods with index aware mode in tape drive for writing an index file on tape storage media, in accordance with an embodiment of the present invention.

It is understood from the table that in both cases of initialization and second and subsequent mounting, the cost spent for unmounting is almost the same in both methods when the position in tape unmounting is in the vicinity of the beginning of tape media 132 (N2=0) though component 122 requires a lower cost than the conventional method as N2 is closer to the rear end of tape media 132, as depicted in FIG. 4. It is also understood that the cost spent for initialization is improved significantly in comparison with the case of using only the reverse wrap mode without using the present method. It is further understood that application of component 122 to LTFS requires a lower cost than the conventional method according to the comparison of total cost in mounting and unmounting, as illustrated in FIG. 4.

Figure 5:
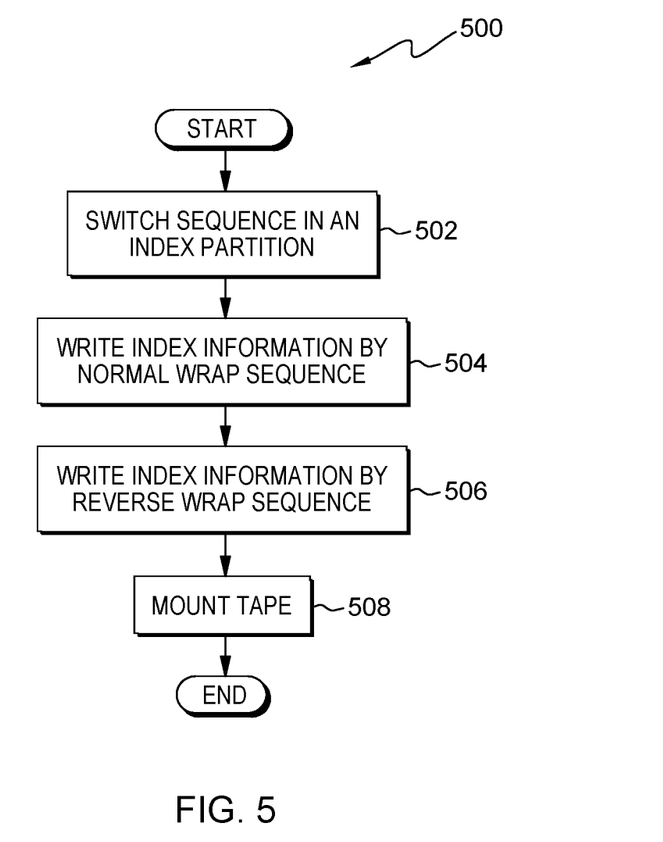
FIG. 5 illustrates operational steps of the index aware mode in tape drive, within the distributed data processing environment of FIG. 1, for writing an index file on tape storage media, in accordance with an embodiment of the present invention.

FIG. 5 illustrates operational steps of component 122, generally designated 500, within distributed data processing environment 100 of FIG. 1, for writing an index file on tape storage media, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502 component 122 switches sequence in an index partition. In various embodiments of the present invention, component 122 enables tape drive 130 to switch write sequences. In various embodiments of the present invention, component 122, via tape drive 130, switches write sequences in an index partition, wherein the index partition is an area to record index information of data (e.g., one or more files) enabled and/or ready to be written on tape media 132. Component 122 may switch between normal wrap sequence and reverse wrap sequence, wherein the index information is written from the beginning to the end of tape media 132, and wherein the reverse wrap sequence the index information is written from the end to the beginning of tape media 132.

In step 504 component 122 writes index information by normal wrap sequence. In various embodiments of the present invention, component 122 writes, via tape drive 130, the index information by the normal wrap sequence in initialization of tape media 132 being mounted for the first time.

In step 506 component 122 writes index information by reverse wrap sequence. In various embodiments of the present invention, component 122 writes, via tape drive 130, the index information by the reverse wrap sequence in the unmounting of tape media 132 for the first time.

In step 508 component 122 mounts tape media 132. In various embodiments of the present invention, component 122, via tape drive 130, mounts tape media 132 based on index information written at the rearmost end of data partitions in second and subsequent mounting.

Figure 6:
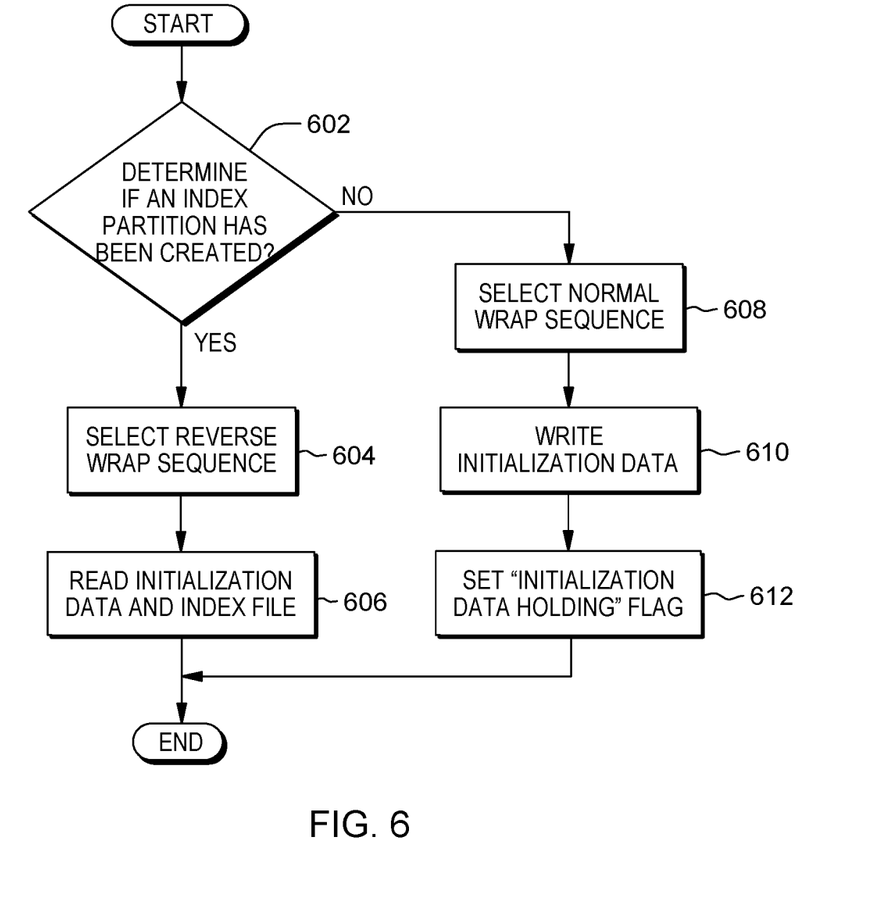
FIG. 6 illustrates operational steps of the index aware mode in tape drive, within the distributed data processing environment of FIG. 1, for mount behavior while writing an index file on tape storage media, in accordance with an embodiment of the present invention.

FIG. 6 illustrates operational steps of component 122, generally designated 600, within distributed data processing environment 100 of FIG. 1, for mount behavior while writing an index file on tape storage media, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In step 602, component 122 determines if the index partition has been created. In various embodiments of the present invention, component 122 determines if one or more index partitions have been created. In the depicted embodiment, if component 122 determines one or more index partitions have been created (Yes step), then component 122 advances to step 604. In the depicted embodiment, if component 122 determines no index partition has been created (No step), then component 122 advances to step 608.

In step 604, component 122 selects revers wrap sequence. In various embodiments of the present invention, component 122 selects the reverse wrap sequence if component 122 determines one or more partitions have been created.

In step 606, component 122 reads initialization data and index file. In various embodiments of the present invention, component 122 reads the initialization data on tape media 132 and index file in the one or more index partitions.

In step 608, component 122 selects normal wrap sequence. In various embodiments of the present invention, component 122 selects the normal wrap sequence if no index partions have been created.

In step 610, component 122 writes initialization data. In various embodiments of the present invention, component 122 writes initialization data on tape media 132.

In step 612, component 122 sets an initialization data holding flag on tape media 132. In various embodiments of the present invention, component 122 generates and sets an initialization data holding flag on tape media 132 based on the written initialization data.

Figure 7:
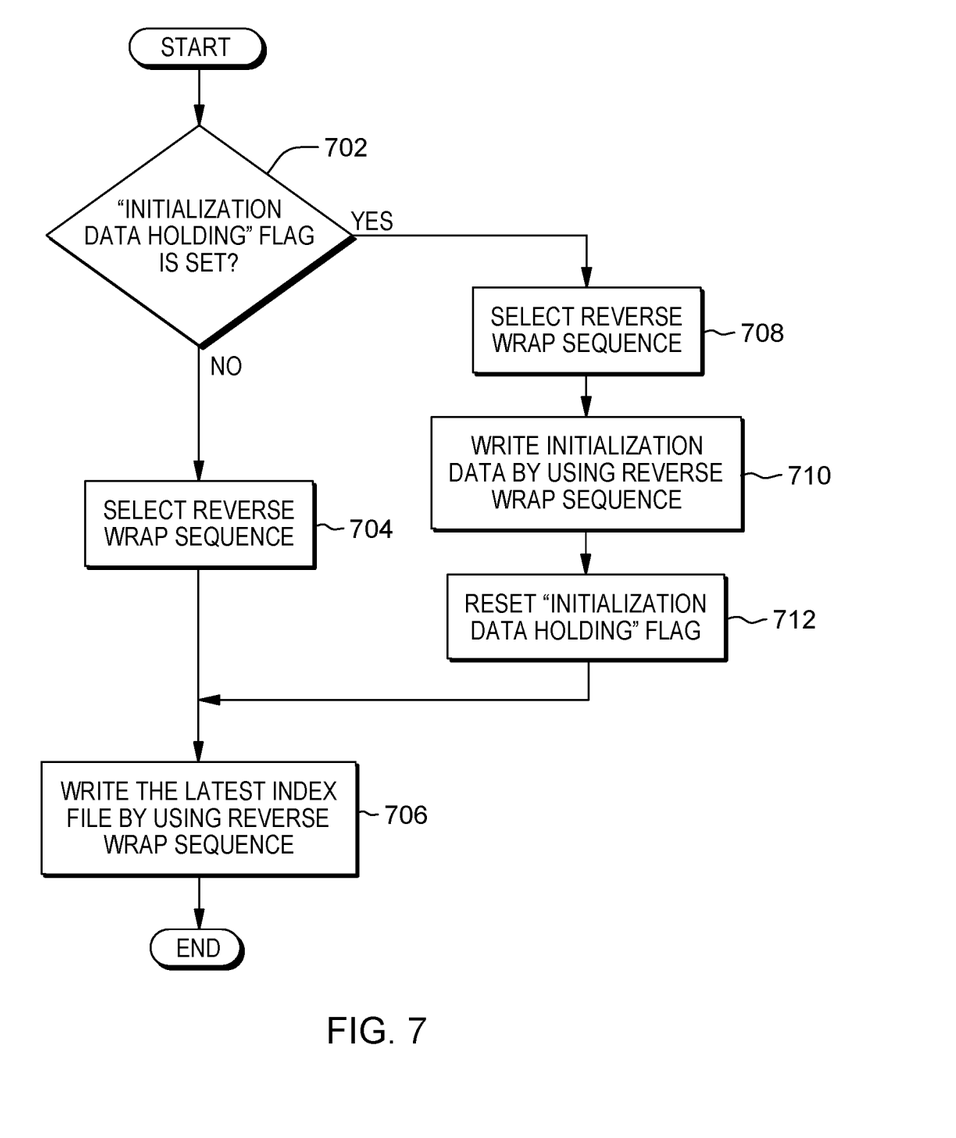
FIG. 7 illustrates operational steps of the index aware mode in tape drive, within the distributed data processing environment of FIG. 1, for unmount behavior while writing an index file on tape storage media, in accordance with an embodiment of the present invention.

FIG. 7 illustrates operational steps of component 122, generally designated 700, within distributed data processing environment 100 of FIG. 1, for unmount behavior while writing an index file on tape storage media, in accordance with an embodiment of the present invention. FIG. 7 provides an illustration of one implementation and does not imply any limitations with regard to the environments in which different embodiments may be implemented. Many modifications to the depicted environment may be made by those skilled in the art without departing from the scope of the invention as recited by the claims In step 702, component 122 determines if the initialization data holding flag is set. In various embodiments of the present invention, component 122 determines if one or more initialization data holding flags are set on one or more tape media 132. In the depicted embodiment, if component 122 determines the initialization data holding flag is set (Yes step), the component 122 advances to step 704. In the depicted embodiment, if component 122 determines the initialization data holding flag is not set (No step), the component 122 advances to step 710.

In step 704, component 122 selects the reverse wrap sequence. In various embodiments of the present invention, component 122 selects and initiates the select reverse wrap sequence.

In step 706, component 122 writes initialization data by using the reverse wrap sequence. In various embodiments of the present invention, component 122 writes initialization data on tape media 132 using the reverse wrap sequence.

In step 708, component 122 resets the set initialization data holding flag. In various embodiments of the present invention, component 122 resets the set initialization data holding flag on tape media 132 based on the written initialized data using the reverse wrap sequence in step 706.

In step 710, component 122 selects the reverse wrap sequence. In various embodiments of the present invention, component 122 selects the reverse wrap sequence in no initialization data holding flag is set.

In step 712, component 122 writes the latest index file by using reverse wrap sequence. In various embodiments of the present invention, component 122 writes the latest index file on tape media 132 using the reverse wrap sequence.

Figure 8:
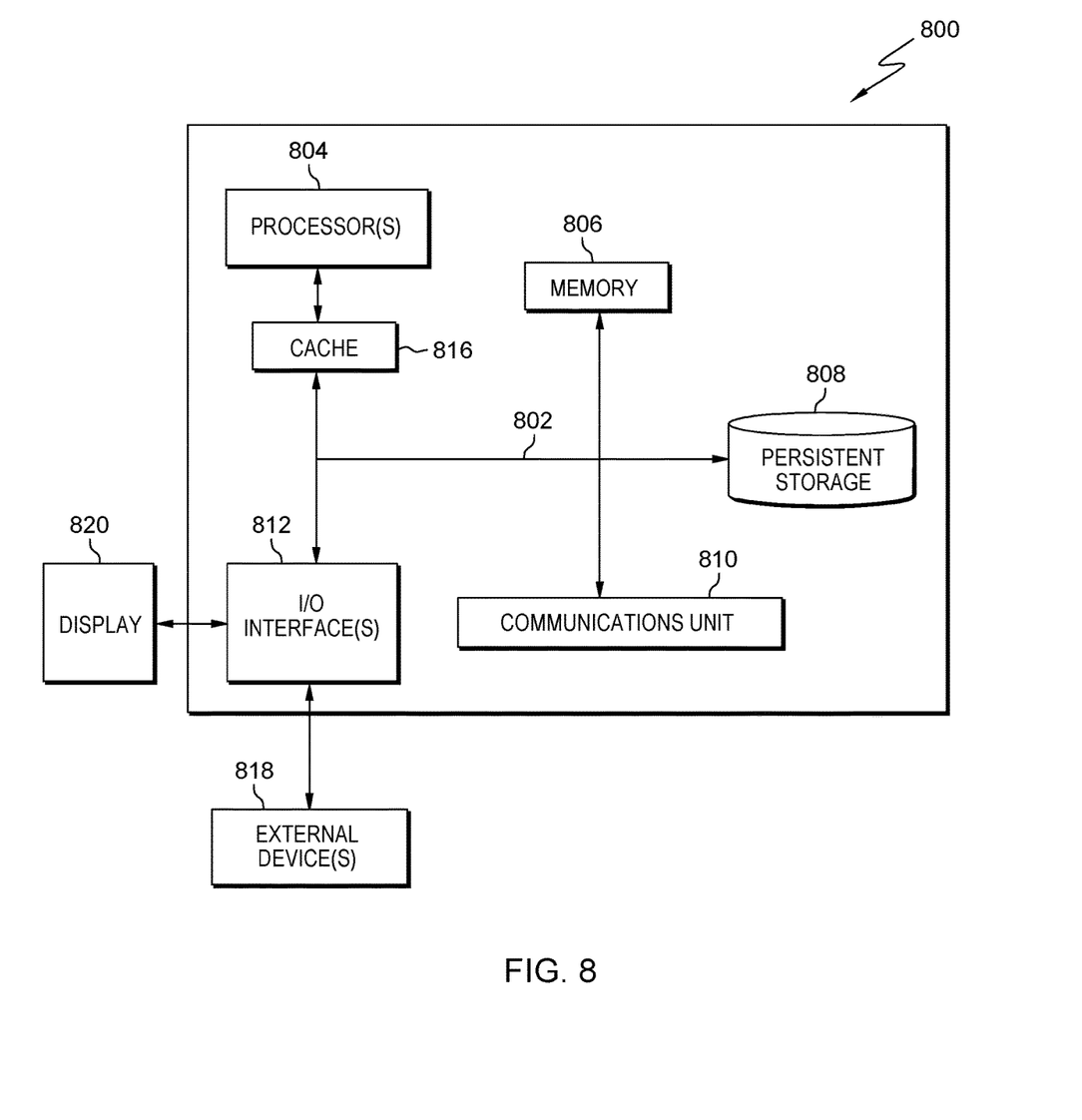
FIG. 8 illustrates a block diagram of components of the server executing the index aware mode in tape drive, within the distributed data processing environment of FIG. 1, in accordance with an embodiment of the present invention.

FIG. 8 illustrates a block diagram of components of communication device 110, computer system 120 and tape drive 130 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 depicts computer system 800, where computer system 120 represents an example of computer system 800 that includes component 122. Computer system 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Computer system 800 includes processors 804, cache 816, memory 806, persistent storage 808, communications unit 810, input/output (I/O) interface(s) 812 and communications fabric 802. Communications fabric 802 provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present invention may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing writing an index file on a tape storage media, the computer-implemented method comprising:
    switching, via a tape drive, write sequences in an index partition, wherein the index partition is an area to record index information of data, and wherein the tape drive switches between a normal wrap sequence and a reverse wrap sequence;

writing the index information by the normal wrap sequence during initialization of the tape media, wherein the tape media is being mounted for a first time; and writing the index information by the reverse wrap sequence during an unmounting the tape media for a first time, and wherein the tape media is mounted based on index information written at a rearmost end of one or more data partitions during second and subsequent mounting, further comprising: responsive to determining no initialization data flag is set, selecting the reverse wrap sequence; and writing the latest index file on the tape media using the selected reverse wrap sequence.

2. The computer-implemented method of claim 1, wherein the normal wrap sequence comprises:

writing index information from the beginning to the end of the tape media.

3. The computer-implemented method of claim 1, wherein the reverse wrap sequence comprises:

writing index information from the end to the beginning of the tape.

4. The computer-implemented method of claim 1, further comprising:

responsive to determining no index partition has been created, selecting the normal wrap sequence;

writing initialization data to the tape media using the normal wrap sequence; and setting an initialization data holding flag on the tape media.

5. The computer-implemented method of claim 1, further comprising:

responsive to determining one or more index partitions have been created, selecting the reverse wrap sequence; and reading the initialization data and index file on the tape media.

6. The computer-implemented method of claim 1, further comprising:

responsive to determining one or more initialization data flags are set, selecting the reverse wrap sequence;

writing initialization data to the tape media using the reverse wrap sequence; resetting the one or more initialization data holding flags; and writing the latest index file on the tape media using the selected reverse wrap sequence.

7. A computer program product for optimizing the writing an index file on tape storage media, the computer program product comprising:

one or more non-transitory computer readable storage media and program instructions stored on the one or more computer readable storage media, the program instructions comprising:

program instructions to switch, via a tape drive, write sequences in an index partition, wherein the index partition is an area to record index information of data, and wherein the tape drive switches between a normal wrap sequence and a reverse wrap sequence;

program instructions to writing the index information by the normal wrap sequence during initialization of the tape media, wherein the tape media is being mounted for a first time; and program instructions to writing the index information by the reverse wrap sequence during an unmounting the tape media for a first time, and wherein the tape media is mounted based on index information written at a rearmost end of one or more data partitions during second and subsequent mounting, further comprising: responsive to determining no initialization data flag is set, program instructions to select the reverse wrap sequence; and program instructions to write the latest index file on the tape media using the selected reverse wrap sequence.

8. The computer program product of claim 7, wherein the normal wrap sequence comprises:

program instructions to write index information from the beginning to the end of the tape media, and wherein the reverse wrap sequence comprises:

program instructions to write index information from the end to the beginning of the tape.

9. The computer program product of claim 7, further comprising:

responsive to determining no index partition has been created, program instructions to select the normal wrap sequence;

program instructions to write initialization data to the tape media using the normal wrap sequence; and program instructions to set an initialization data holding flag on the tape media.

10. The computer program product of claim 7, further comprising:

responsive to determining one or more index partitions have been created, program instructions to select the reverse wrap sequence; and program instructions to read the initialization data and index file on the tape media.

11. The computer program product of claim 7, further comprising:

responsive to determining one or more initialization data flags are set, program instructions to select the reverse wrap sequence;

program instructions to write initialization data to the tape media using the reverse wrap sequence;

program instructions to reset the one or more initialization data holding flags; and program instructions to write the latest index file on the tape media using the selected reverse wrap sequence.

12. A computer system for optimizing the writing an index file on tape storage media, the computer system comprising:

one or more computer processors;

one or more non-transitory computer readable storage media;

program instructions stored on the one or more computer readable storage media for execution by at least one of the one or more computer processors, the program instructions comprising:

program instructions to switch, via a tape drive, write sequences in an index partition, wherein the index partition is an area to record index information of data, and wherein the tape drive switches between a normal wrap sequence and a reverse wrap sequence;

program instructions to writing the index information by the normal wrap sequence during initialization of the tape media, wherein the tape media is being mounted for a first time; and program instructions to writing the index information by the reverse wrap sequence during an unmounting the tape media for a first time, and wherein the tape media is mounted based on index information written at a rearmost end of one or more data partitions during second and subsequent mounting, further comprising: responsive to determining no initialization data flag is set, program instructions to select the reverse wrap sequence; and
program instructions to write the latest index file on the tape media using the selected reverse wrap sequence.

13. The computer system of claim 12, wherein the normal wrap sequence comprises:
program instructions to write index information from the beginning to the end of the tape media.

14. The computer system of claim 12, wherein the reverse wrap sequence comprises:
program instructions to write index information from the end to the beginning of the tape.

15. The computer system of claim 12, further comprising:
responsive to determining no index partition has been created, program instructions to select the normal wrap sequence;
program instructions to write initialization data to the tape media using the normal wrap sequence; and
program instructions to set an initialization data holding flag on the tape media.

16. The computer system of claim 12, further comprising:
responsive to determining one or more index partitions have been created, program instructions to select the reverse wrap sequence; and
program instructions to read the initialization data and index file on the tape media.

17. The computer system of claim 12, further comprising:
responsive to determining one or more initialization data flags are set, program instructions to select the reverse wrap sequence;
program instructions to write initialization data to the tape media using the reverse wrap sequence;
program instructions to reset the one or more initialization data holding flags; and
program instructions to write the latest index file on the tape media using the selected reverse wrap sequence.

* * * * *